United States Patent

Kavanaugh et al.

[11] Patent Number: 5,421,610
[45] Date of Patent: Jun. 6, 1995

[54] INFLATABLE AIRBAG

[75] Inventors: Christopher P. Kavanaugh; Simon Valkenburg, both of Cheshire; Raymond Graham, Yorkshire, all of England

[73] Assignee: Airbags International Limited, Chesire, England

[21] Appl. No.: 182,380

[22] Filed: Jan. 14, 1994

Related U.S. Application Data

[63] Continuation of Ser. No. 918,960, Sep. 14, 1992, abandoned.

[30] Foreign Application Priority Data

Jul. 26, 1991 [GB] United Kingdom ............... 9116188

[51] Int. Cl.6 ........................................... B60R 21/16
[52] U.S. Cl. ............................ 280/743.1; 188/376
[58] Field of Search ................ 280/728 R, 736, 739, 280/742, 743 R; 188/371, 376

[56] References Cited

U.S. PATENT DOCUMENTS

| 3,891,272 | 6/1975 | Takada | 280/743 |
| 3,990,726 | 11/1976 | Oka et al. | 280/739 |
| 4,588,208 | 5/1986 | Yoshitsugu | 188/376 |
| 5,048,863 | 9/1991 | Hanseler et al. | 280/743 |
| 5,094,477 | 3/1992 | Togawa | 280/743 |

FOREIGN PATENT DOCUMENTS 2542764  4/1977  Germany ............... 280/739

Primary Examiner—Margaret A. Focarino
Assistant Examiner—Paul N. Dickson
Attorney, Agent, or Firm—Reising, Ethington, Barnard Perry & Milton

[57] ABSTRACT

An inflatable airbag comprises a front part (20) and a rear part (22), or front, rear and side parts joined together by at least one tear seam (24) comprising stitching of tortuous pattern.

12 Claims, 3 Drawing Sheets 15,421,610

INFLATABLE AIRBAG

This is a continuation of application Ser. No. 07/918,960 filed on Sep. 14, 1992, abandoned.

TECHNICAL FIELD

This invention relates to inflatable airbags for the protection of vehicle occupants in the event of a crash, such airbags are of fabric, when inflated, are conventionally lens-shaped or, in the case of a passenger bag, substantially cylindrical, and are stowed in front of the the respective occupants of a vehicle.

They are arranged to be inflated almost instantaneously by a gas generation if a crash occurs and to commence to deflate immediately, so as temporarily to restrain the occupants and thus prevent them from being injured by being thrown against hard interior surfaces of the vehicle.

BACKGROUND OF THE INVENTION

Together with the safety benefits conferred by such airbags, there are also possible deleterious effects associated with their inflation and with variations in the size and position of the vehicle occupants, the sudden inflation of an airbag can produce so called "bag slap" whereby a part of the airbag travels further dynamically than its static fully inflated shape would suggest, and strikes the occupant at high speed. This occurs during the first 15 to 20 milli-seconds after crash impact, and before the airbag is fully inflated. In order to reduce the risk of "bag slap" a number of systems are currently in use. In one such system, permanent tethers or straps of webbing or fabric are formed between that part of the airbag which contacts the vehicle occupant and that part of the airbag having a throat hole for connection to the gas generator, hereinafter called the front part and the rear part of the airbag, so as to control the static shape of the airbag. In another such system, the front and rear parts of the airbag are sewn together by "tear seams" which fail when the airbag is inflated so as to alter its deployment characteristics and absorb some energy thereby reducing the speed of the front part of the airbag. The known tear seams comprise straight rows of stitching which absorb energy and restrain relative displacement of the front and rear parts of the airbag until they suddenly fail, whereupon relative displacement of said parts occurs without any further restraint. A passenger bag has both front and rear parts as well as sides, some or all of which may be joined together by the aforementioned tear seams.

SUMMARY OF THE INVENTION

The object of the present invention is to provide an improved tear seam system which fails progressively and thus absorbs energy more effectively than hitherto.

According to the invention, an inflatable airbag has at least one tear seam comprising stitching of tortuous pattern.

The component parts may comprise simpy front and rear parts or, in the case of a passenger bag, front, back and side parts. The tear seam may join a front part to a rear part, a front or rear part to a respective side part, or one portion of a front, rear or side part to another portion of that same front, rear or side part.

The length and width of the tortuous pattern are preferably variable.

The tortuous pattern may be a castellated pattern of square wave form.

Alternatively, the tortuous pattern is a snake pattern of sine wave form.

Alternatively, the tortuous pattern is a ladder pattern or a "stake" pattern as described more fully hereinafter.

The thread used on the front part of the airbag is preferably thinner than that used on the rear part thereof.

The tortuous pattern may comprise combinations of different stitch lengths.

Preferably, the type of stitching used in lock-stitch.

The airbag may have a plurality of radially-extending tear seams which are equally spaced apart angularly.

It should be noted that the tear seams of the invention are tortuous on a relatively small scale, i.e., within one seam pattern and not in relation to multiple patterns and their positioning. The overall seam pattern can include a straight or some other shape, e.g. part circular. It is the tortuous shape of the stitch pattern, i.e. the fact that sewing is made in more than one direction in one continuous line, which gives the advantages of the invention.

BRIEF DESCRIPTION OF THE DRAWINGS

The invention will now be described, by way of example only, with reference to the accompanying diagrammatic drawings of which.

DETAILED DESCRIPTION OF THE PREFERRED EMBODIMENTS

Figure 1:
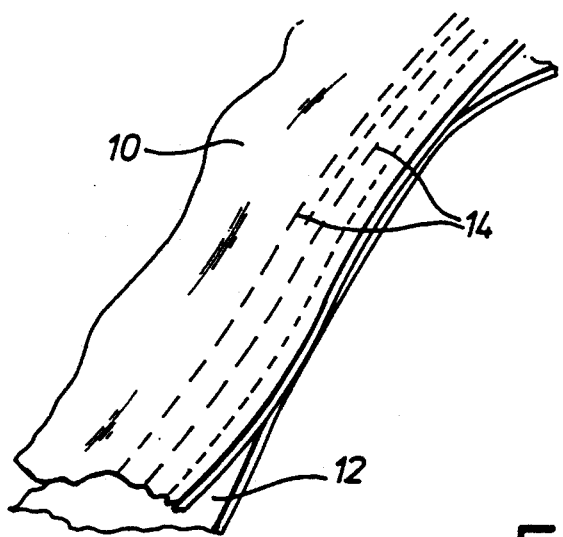
FIG. 1 is a perspective view of part of an airbag having tear seams of known type.
Figure 2:
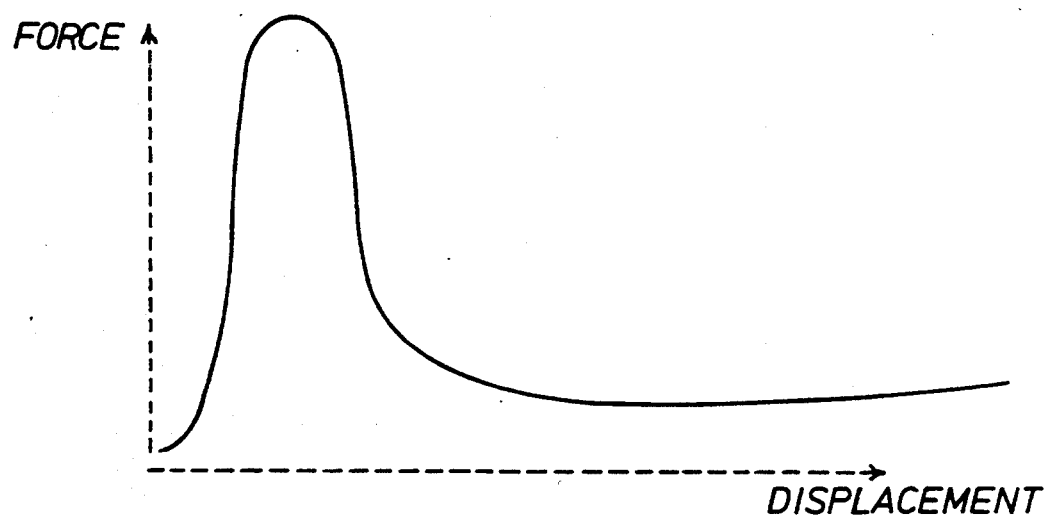
FIG. 2 is a graph showing characteristic force/displacement curve of the known airbag of FIG. 1.

Referring now to FIG. 1 of the drawings, the front part 10 and the rear part 12 of an airbag currently in use are sewn together by tear seams comprising two parallel straight rows 14 of stitching. Each row 14 generally starts with a lock-off and uses a polyester thread of a size larger than that used in the normal seams which sew together the basic bag. FIG. 2 shows that this is not an effective way of absorbing energy, as the lock off of thread requires a high force to initiate failure following which the straight rows 14 of stitching fail with a simple peeling action, whereupon relative displacement of said parts occurs with little further restraint.

Figure 3:
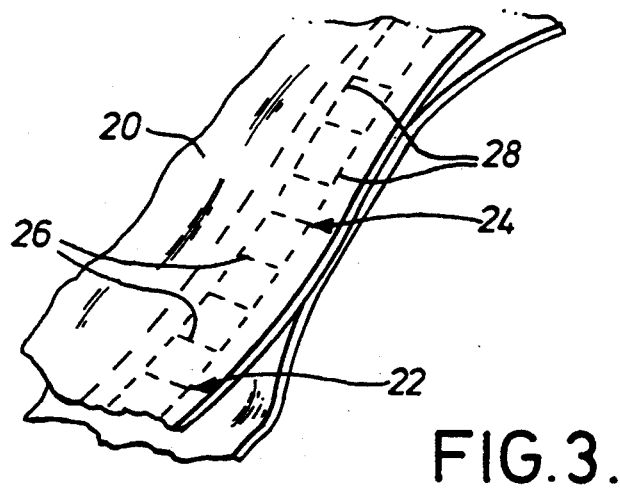
FIG. 3 is a perspective view corresponding to FIG. 1 of part of the airbag having one form of tear seam according to the invention.
Figure 4:
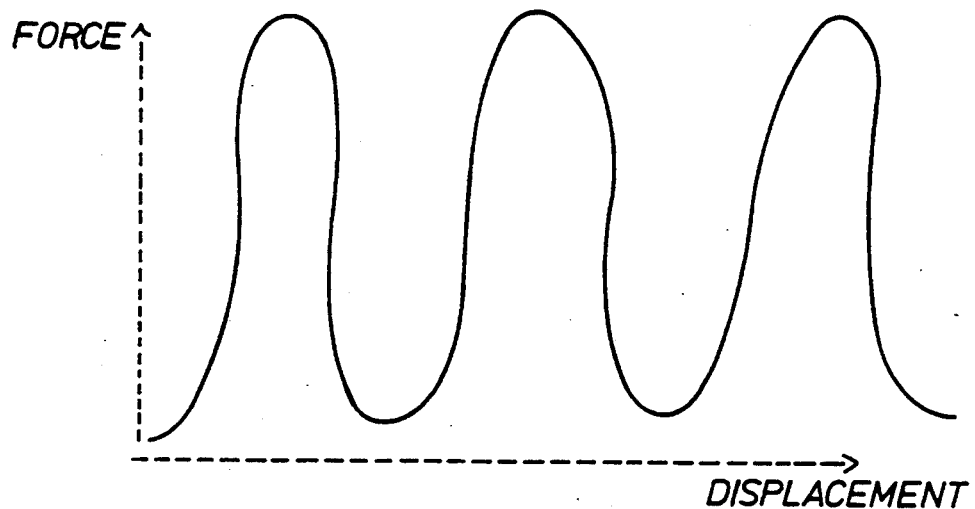
FIG. 4 is a graph corresponding to FIG. 2 showing a characteristic force/displacement curve of the airbag of FIG. 3.

Referring now to FIG. 3, the front part 20 and the rear part 22 of an airbag according to the invention has a tear seam indicated generally at 24 comprising stitching of tortuous ladder pattern with "rungs" 26 and "sides" 28. FIG. 4 shows that this provides much improved energy absorption, as the tortuous tear seam 24 fails progressively so that there is continuing restraint of relative displacement of the front and rear parts of the airbag. Typical dimensions of the tear seam 24 are, for example:

spacing of the ladder "rungs": 20 mm
spacing of the ladder "sides": 15 mm
stitch pattern: 3-4 per cm
thread size: 20 Nm
thread material: nylon Alternative thread materials can be used, dependent upon the bag fabric used, such a polyamide, polyester, aramid, polyolefin, polyvinylalcohol, polyethylene, acrylic, polyurethane, carbon, glass, ceramic, metal and elastic, with alternative metric sizes 6, 10, 12, 15, 18, 20, 30 and 40 Nm.

Figure 5:
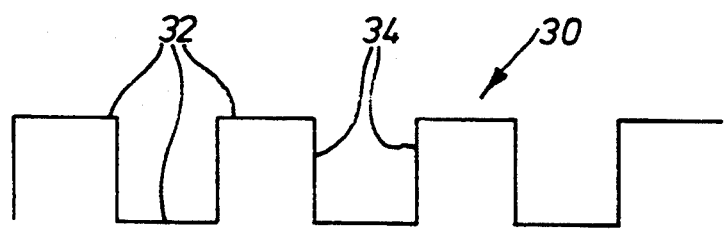
FIG. 5 shows another form of tear seam according to the invention.

FIG. 5 shows another form of the tear seam indicated generally at 30 comprising stitching of tortuous castellated pattern of square wave form with parallel portions 32 connected by transverse portion 34. The parallel portions 32 can be all the same length as shown, or different lengths.

Figure 6:
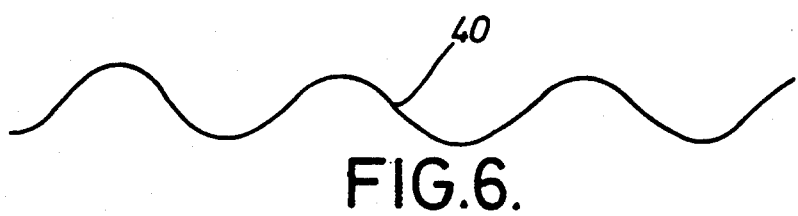
FIG. 6 shows a further form of tear seam according to the invention.

FIG. 6 shows a further form of tear seam 40 comprising stitching of tortuous snake pattern of sine wave form.

Figure 9:
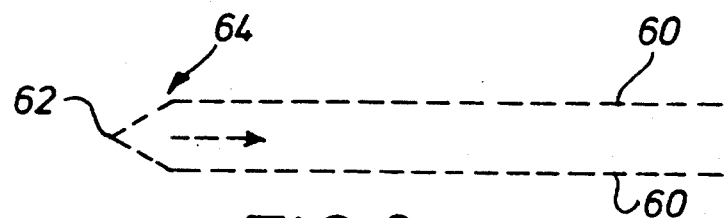
FIG. 9 is a further form of tear seam.

The patterns of FIGS. 5, 6 and 9 are particularly suited to CNC type sewing machines.

Figure 7:
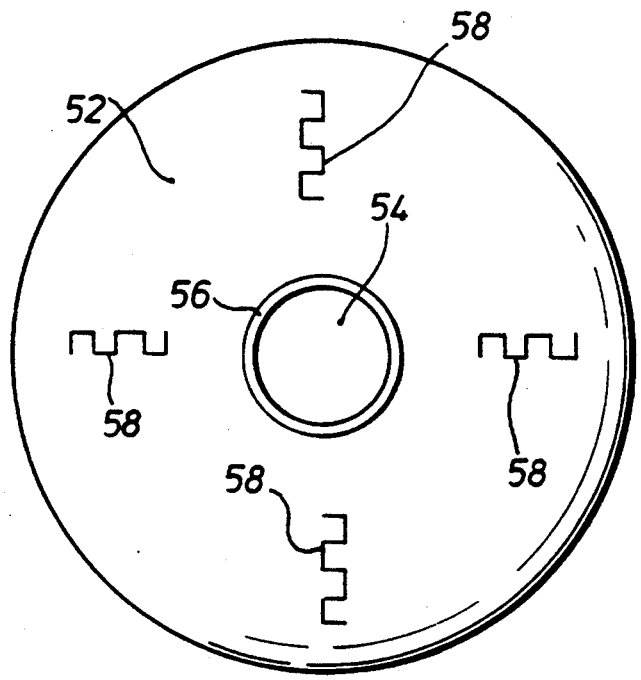
FIG. 7 is a plan view of the rear part of an airbag having tear seams of the form shown in FIG. 5.
Figure 8:
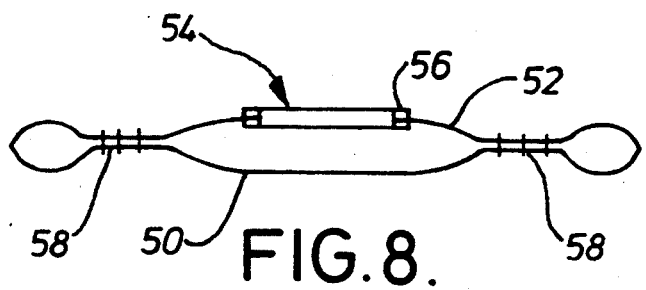
FIG. 8 is a diametrical section through the airbag of FIG. 7.

FIGS. 7 and 8 show an airbag having a front part 50, and a rear part 52 with a throat hole 54 surrounded by an attachment flange 56 for a gas generator (not shown). The front part 50 and the rear part 52 are sewn together by four radially-extending tear seams 58 of the pattern shown in FIG. 5 which are spaced 90° apart. Other dispositions of tear seams on an airbag are possible.

FIG. 9 shows yet another modified form of tear seam according to the invention. The seam comprises two general parallel lines of stitching 60 meeting at a part 62. The latter forms a "tear initiator" and greatly reduces the initial force needed to start the tearing action. This reduces tear damage to the fabric. The two seams 60 ensure that sufficient energy is absorbed during tearing. The stitches 60 need not be straight lines, the "tortuous" element is provided by portion 64 which ends in the point 62. The seam is preferably sewn in one run starting at the right hand end (as viewed in FIG. 9) of one of the stitches 60, through the point 62 and back along the other seam 60. This prevents undue weakening of the fabric from having two stitch entering points at 62. This seam pattern is referred to as a "stake" pattern. The patterns of the tortuous tear seams are variable whereby the energy absorption and the inflation characteristics of airbags of different shapes, sizes, fabrics and the like can be optimised.

The patterns can also comprise combinations of different stitch lengths. For example, the stitch length on the transverse portions 34 in FIG. 5 may be 3 to 4 stitches per cm. while that on the parallel portions 32 may be 2 stitches per cm., but any stitch length between 1 and 6 cm. can be used.

The thread material and size should be suitable for the bag fabric used so as not to damage the fabric in the event of inflation. By using thread on the front part of the airbag which is thinner by say 10 Nm than that used on the rear part thereof, inflation will cause controlled breaking of the thinner thread. The torn ends of the thinner thread will be pulled inside the airbag by the thicker thread thus preventing any loose ends from being flung towards the occupant. Thread and fabric of the same type assist recyclability.

Tortuous stitched tear seams can be employed with equal benefit both on sewn airbags and on those woven in one place.

The advantages of the tortuous seams hereinbefore described and illustrated include less-localised stresses in and thus less risk of damage to the bag fabric; energy absorption which is progressive, reproduceable, and controllable along co-ordinates; and better protection for the occupant from "bag slap" and from flying loose ends of thread.

Examples Static pull tests on seams according to the invention were performed to measure average forces and energy absorbed by the seams. Summary data is tabulated below:

| Seam Pattern Energy | Thread Size (Nm) | Stitch Size per cm | Average Force (N) | (J) |
|---|---|---|---|---|
| *Straight with back tack | 30 top 40 bottom | 3-4 | 48 | 5.2 |
| Square wave | 30 top 40 bottom | 3-4 | 82 | 11.1 |
| Sine wave | 30 top 40 bottom | 3-4 | 59 | 8.0 |
| Stake | 30 top 40 bottom | 3-4 | 81 | 10.5 |

*conventional - for comparison

Dynamic firing tests were also carried out on a variety of drivers-side airbags with tear seams to compare to standard. The contact speed of the fabric face to a potential occupant was analysed and the data is tabulated below:

| BAG TYPE | CONTACT SPEED (Km/h) |
|---|---|
| *Current Technology (Coated with straps) | 60 |
| Uncoated with no straps | 120 |
| Uncoated with square wave tear seam | 58 |
| Uncoated with sine wave tear seam | 80 |
| Uncoated with stake tear seam | 50 |

All tear seams used the same top and bottom thread configuration and test conditions were the same in each case.

It will be seen that the invention brings down the contact speed of an uncoated bag with no internal straps down to that comparable with the far more complicated and costly prior technology in which internal restraining straps are sewn in place and the bag fabric is coated.

We claim:

1. An inflatable airbag with an inlet for connection to a gas generator to supply a pressurized gas for inflating the airbag, the airbag comprising:
a plurality of bag enclosing wall sections joined together to form the bag, wherein to control the deployment characteristics of the bag selected areas of the bag sections are joined together by at least one continuous tear seam extending in a line and having a shaped stitching pattern with a first plurality of transversly spaced longitudinal sections substantially parallel to said line and a second plurality of sections extending transverse to said line that are interposed between said first plurality of sections, over at least a part of its length, such that when acted upon by the forces created during inflation of the bag the tear seam will fail progressively substantially along the line thereby providing continuing restraint of relative displacement of said joined enclosing wall sections away from each other during further inflation of the bag.

2. An inflatable airbag according to claim 1 in which said at least one tear seam joints a front part of the airbag to a rear part.

3. An inflatable airbag according to claim 1 in which said at least one tear seam joins a front part of the airbag to a respective side part.

4. An inflatable airbag according to claim 1 in which said at least one tear seam joins a rear part of the airbag to a respective side part.

5. An inflatable airbag according to claim 1 in which the shaped stitching pattern is a ladder pattern.

6. An inflatable airbag according to claim 1 in which the shaped stitching pattern is a stake pattern.

7. An inflatable airbag according to claim 2 in which a thread used on the front part of the airbag is thinner than that used on the rear part thereof.

8. An inflatable airbag according to claim 1 in which the shaped stitching pattern comprises combinations of different stitch lengths.

9. An inflatable airbag according to claim 2 wherein there is provided a plurality of radially-extending tear seams which are equally spaced apart angularly.

10. An inflatable airbag according to claim 9 in which said plurality of tear seams are symmetrically spaced both angularly and radially.

11. An inflatable airbag of the type comprising integrally woven front and rear parts wherein said front part is sewn to said rear part by at least one tear seam extending in a line and having a shaped stitching pattern with a first plurality of transversely spaced longitudinal sections substantially parallel to said line and a second plurality of sections extending transverse to said line that are interposed between said first plurality of sections.

12. An inflatable airbag with an inlet for connection to a gas generator to supply a pressurized gas for inflating the airbag, the airbag comprising:

a plurality of airbag enclosing wall sections joined together to form the airbag, wherein to control the deployment characteristics of the airbag selected areas of the airbag sections are joined together by two parallel stitched tear seams being laterally spaced apart and having converging stitching sections that converge to a single terminal point at beginning portions of the parallel stitched tear seams.

* * * * *